(12) United States Patent
Casse et al.

(10) Patent No.: US 9,545,923 B2
(45) Date of Patent: Jan. 17, 2017

(54) METAMATERIAL-BASED OBJECT-DETECTION SYSTEM

(71) Applicant: Palo Alto Research Center Incorporated, Palo Alto, CA (US)

(72) Inventors: Bernard D. Casse, Saratoga, CA (US); Armin R. Volkel, Mountain View, CA (US); Victor Liu, Palo Alto, CA (US); Alexander S. Tuganov, Redwood City, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 14/331,024

(22) Filed: Jul. 14, 2014

(65) Prior Publication Data
US 2016/0011307 A1    Jan. 14, 2016

(51) Int. Cl.
B60W 30/14 (2006.01)
G01S 13/42 (2006.01)
(Continued)

(52) U.S. Cl.
CPC .............. *B60W 30/14* (2013.01); *G01S 13/426* (2013.01); *G01S 13/931* (2013.01);
(Continued)

(58) Field of Classification Search
CPC ..... B81B 3/0021; H01J 49/025; B60W 30/14; G01S 13/426; H01Q 1/3233
See application file for complete search history.

(56) References Cited

U.S. PATENT DOCUMENTS 4,779,000 A   10/1988  Ing
5,712,166 A   1/1998   Broan
(Continued)

FOREIGN PATENT DOCUMENTS

WO    0143228 A    6/2001

OTHER PUBLICATIONS

Aoyama, Takahiko et al. "Energy response of a full-energy-absorption neutron spectrometer using boron-loaded liquid scintillator BC-523", Nuclear Instruments and Methods in Physics Research A 333 (1993) 492-501, 10 pages.

(Continued)

*Primary Examiner* — Basil T Jos
(74) *Attorney, Agent, or Firm* — Bever, Hoffman & Harms, LLP

(57) ABSTRACT

An object-detection system for, e.g., a vehicle collision avoidance system, utilizes a metamaterial-based phase shifting element array to generate a scan beam by varying the effective capacitance of each metamaterial structure forming the array in order to control the phases of their radio frequency output signals such that the combined electromagnetic wave generated by the output signals is reinforced in the desired direction and suppressed in undesired directions to produce the scan beam. The metamaterial structures are configured to resonate at the same radio wave frequency as an incident input signal (radiation), whereby each metamaterial structure emits an associated output signal by way of controlled scattering the input signal. A variable capacitance is applied on each metamaterial structure, e.g., using varicaps that are adjusted by way of phase control voltages, to produce the desired output phase patterns. The metamaterial structures are constructed using inexpensive metal film or PCB fabrication technology.

20 Claims, 10 Drawing Sheets

(51) Int. Cl.
*H01Q 1/32* (2006.01)
*G01S 13/93* (2006.01)
*H01Q 3/46* (2006.01)
*H01Q 15/00* (2006.01)
*H01Q 15/14* (2006.01)
*H01Q 21/00* (2006.01)
*G01S 13/02* (2006.01)

(52) U.S. Cl.
CPC ......... *H01Q 1/3233* (2013.01); *H01Q 1/3283* (2013.01); *H01Q 3/46* (2013.01); *H01Q 15/0086* (2013.01); *H01Q 15/148* (2013.01); *H01Q 21/0093* (2013.01); *G01S 2013/0254* (2013.01); *G01S 2013/9375* (2013.01); *G01S 2013/9389* (2013.01)

(56) References Cited

U.S. PATENT DOCUMENTS

| | | | |
|---|---|---|---|
| 5,905,263 | A | 5/1999 | Nishizawa |
| 7,002,517 | B2 | 2/2006 | Noujeim |
| 8,621,245 | B2 | 12/2013 | Shearer |
| 8,680,945 | B1 | 3/2014 | Wang |
| 2002/0180639 | A1 | 12/2002 | Rickett |
| 2004/0207486 | A1 | 10/2004 | York |
| 2004/0238751 | A1 | 12/2004 | Penn |
| 2008/0049228 | A1 | 2/2008 | Chan |
| 2011/0303850 | A1 | 12/2011 | Barillon |
| 2012/0133547 | A1* | 5/2012 | MacDonald et al. ........... 342/70 |
| 2012/0314541 | A1* | 12/2012 | Matsuura .............. G01S 15/931 367/94 |
| 2014/0266946 | A1 | 9/2014 | Billy et al. |
| 2014/0300520 | A1 | 10/2014 | Nguyen et al. |
| 2014/0355381 | A1* | 12/2014 | Lal et al. ........................ 367/87 |
| 2015/0214927 | A1 | 7/2015 | Greene |
| 2015/0229028 | A1 | 8/2015 | Billy et al. |
| 2015/0236551 | A1 | 8/2015 | Shearer |
| 2015/0276489 | A1 | 10/2015 | Cumming |
| 2015/0318618 | A1 | 11/2015 | Chen et al. |
| 2015/0372389 | A1 | 12/2015 | Chen et al. |
| 2015/0380973 | A1 | 12/2015 | Scheb |
| 2016/0145214 | A1 | 5/2016 | Douce |

OTHER PUBLICATIONS

Flaska, Marek et al., "Digital pulse shape analysis for the capture-gated liquid scintillator BC-523A", Nuclear Instruments and Methods in Physics Research A 599 (2009) 221-225, 5 pages.

Vanier, Peter E., et al., "Directional detection of fission-spectrum neutrons", 1-4244-1302-8/07, 2007 IEEE, 5 pages.

Vanier, Peter E., et al., "Calibration and Testing of a Large-Area Fast-Neutron Directional Detector", Brookhaven National Laboratory, BNL-79632-2007-CP, 8 pages.

Mascarenhas, Nicholas, et al., "Directional Neutron Detectors for Use with 14 MeV Neutrons", Sandia Report, SAND2005-6255, printed Oct. 2005, 32 pages.

Mirenda, Martin, et al., "Ionic liquids as solvents for liquid scintillation technology, Cerenkov counting with 1-Butyl-3-Methylimidazolium Chloride", Radiation Physics and Chemistry 98 (2014) 98-102, 5 pages.

Swiderski, L., et al., "Further Study of Boron-10 Loaded Liquid Scintillators for Detection of Fast and Thermal Neutrons", IEEE Transactions on Nuclear Science, vol. 57, No. 1, Feb. 2010, 6 pages.

* cited by examiner

METAMATERIAL-BASED OBJECT-DETECTION SYSTEM

FIELD OF THE INVENTION

This invention relates to phase shifting elements and methods for shifting the phase of emitted radiant energy for object detection.

BACKGROUND OF THE INVENTION

Phase shifters are two-port network devices that provide a controllable phase shift (i.e., a change the transmission phase angle) of a radio frequency (RF) signal in response to control signal (e.g., a DC bias voltage). Conventional phase shifters can be generally classified as ferrite (ferroelectric) phase shifters, integrated circuit (IC) phase shifters, and microelectromechanical system (MEMS) phase shifters. Ferrite phase shifters are known for low insertion loss and their ability to handle significantly higher powers than IC and MEMS phase shifters, but are complex in nature and have a high fabrication cost. IC phase shifters (aka, microwave integrated circuit MMIC) phase shifters) use PIN diodes or FET devices, and are less expensive and smaller in size than ferrite phase shifters, but their uses are limited because of high insertion loss. MEMS phase shifters use MEMS bridges and thin-film ferroelectric materials to overcome the limitations of ferrite and IC phase shifters, but still remain relatively bulky, expensive and power hungry.

While the applications of phase shifters are numerous, perhaps the most important application is within a phased array antenna system (a.k.a., phased array or electrically steerable array), in which the phase of a large number of radiating elements are controlled such that the combined electromagnetic wave is reinforced in a desired direction and suppressed in undesired directions, thereby generating a "beam" of RF energy that is emitted at the desired angle from the array. By varying the relative phases of the respective signals feeding the antennas, the emitted beam can be caused to scan or "sweep" an area or region into which the beam is directed. Such scan beams are utilized, for example, in phased array radar systems and other object-detection systems to sweep areas of interest (target fields), where beam energy portions that are reflected (scattered) from an object located in the target field are detected and analyzed to determine the object's position.

Because a large number of phase shifters are typically needed to implement a phased array-based system (e.g., an object-detection system such as radar), the use of conventional phase shifters presents several problems in such phased array-based systems. First, the high cost of conventional phase shifters makes phased array-based systems impractical (i.e., too expensive) for many applications that might otherwise find a phased array useful—it has been estimated that almost half of the cost of a phased array is due to the cost of phase shifters. Second, high power consumption of conventional phase shifters precludes mounting phased arrays on many portable devices and small vehicles that rely on battery power or have otherwise limited power sources, thus limiting the types of devices and vehicles that could power a phased array for a practical amount of time. Third, phased arrays that implement conventional phase shifters are typically highly complex due to the complex integration of many expensive solid-state, MEMS or ferrite-based phase shifters, control lines, together with power distribution networks, as well as the complexity of the phase shifters. Moreover, phased array systems implementing conventional phase shifters are typically very heavy, which is due in large part to the combined weight of the conventional phase shifters), which limits the types of applications in which phased arrays may be used. For example, although commercial airliners and medium sized aircraft have sufficient power to lift a heavy radar system, smaller aircraft, automobiles and drones typically do not.

What is needed is an object-detection system that avoids the weight (bulk), expense, complexity and power consumption of conventional phased array-based object-detection systems. What are also needed are guidance and collision avoidance systems utilizing such object-detection systems.

SUMMARY OF THE INVENTION

The present invention is directed to an object-detection (e.g., radar) system that utilizes a metamaterial-based phase shifting element array and associated beam control circuitry to generate a radio frequency beam that scans (sweeps) across a field disposed in front of the phase shifting element array, and utilizes associated receiver circuitry configured to detect beam portions that are reflected from objects disposed in the field in order to determine the objects' positions.

According to a first aspect of the invention, the metamaterial-based phase shifting element array includes multiple metamaterial structures that are configured to resonate at the radio wave frequency of an applied input signal, whereby each of the metamaterial structures generates an associated output signal at the input signal frequency by retransmitting (i.e., reflecting/scattering) the input signal. Because suitable metamaterial structures are constructible using inexpensive metal film or PCB fabrication technology, and because the metamaterial structures scatter (generate) radio wave frequency output signals without the need for separate antenna feeds, the present invention facilitates the production of object-detection systems that are substantially smaller/ lighter, less expensive, and consumes far less power than systems constructed using conventional phase-shifting elements.

According to a second aspect of the invention, the phase of each output signal is controlled by applying an associated variable capacitance to each of the metamaterial structures such that an effective capacitance of each metamaterial structure is altered by a corresponding change in its associated applied variable capacitance. The present inventors determined that suitable metamaterial structures generate output signals having phase shifts determined by each structure's capacitance, and that these phase shifts "tunable" (adjustably controllable) to a desired phase value by way of applying a suitable variable capacitance to each metamaterial structure. That is, each metamaterial structure's effective (operating) capacitance is a product of the structure's inherent (fixed) capacitance (i.e., capacitance determined by the structure's configuration; i.e., size, shape, distance from adjacent metal structures, etc.) and the associated applied variable capacitance, and thus could be changed by way of varying the associated applied variable capacitance. Accordingly, the present invention introduces a method for generating a large number of radio frequency (output) signals, each with an associated individually adjusted output phase, without the use of conventional phase shifters simply by controlling variable capacitances applied to multiple metamaterial structures disposed in an array.

According to a third aspect of the invention, the beam control circuit is configured to coordinate and vary (i.e., change over time) the variable capacitances applied to each metamaterial structure of the array such that the resulting output signals collectively generate a scan beam that sweeps across a field disposed in front of the phase shifting element array in a predetermined pattern. That is, at each instant a particular set of variable capacitances are applied to the array of metamaterial structures to produce associated output signals having correspondingly different output phases that cumulatively generate the emitted beam in a desired direction (i.e., the combined electromagnetic wave generated by the output signals is reinforced in the desired direction and suppressed in undesired directions, whereby the beam is emitted at a desired angle from the front of the array). Over time, the sets of variable capacitances are varied to produce associated output signals having output phases that gradually change in a way that causes the emitted beam to scan across the field (i.e., such that the beam's angular emission direction gradually changes to produce a characteristic radar-like "sweeping" pattern). By gradually changing the variable capacitances applied to the metamaterial structures in a suitable manner, the present invention facilitates the production of radar-like object-detection systems without using bulky, expensive and power-hungry conventional phase-shifting elements.

According to an exemplary embodiment of the present invention, the beam control circuit is implemented using variable capacitors and a phase control circuit. Each variable capacitor is configured to respectively generate an associated variable capacitance in response to an applied phase control voltage, and is coupled to an associated metamaterial structure of the array such that the effective capacitance of the associated metamaterial structure is altered by corresponding changes in the variable capacitance generated by the variable capacitor. The phase control circuit (e.g., a digital-to-analog converter (DAC) that is controlled by any of a field programmable gate array (FPGA), an application specific integrated circuit (ASIC, or a micro-processor) is configured to generate sets of individual phase control voltages for each of the variable capacitors such that the variable capacitances generated by each variable capacitor vary over time in accordance with changes in the phase control voltages. The use of variable capacitors and an associated phase control circuit further simplifies the resulting system, and facilitates generating accurate phase changes on the output signals generated from the array of metamaterial structures. According to a practical embodiment, the variable capacitors are distributed on the array such that each two-terminal variable capacitor is connected between an associated metamaterial structure and a shared ground potential, thereby facilitating reliable and accurate application of variable capacitances by way direct connection of each metamaterial structures to an independently controlled variable capacitor. In a specific embodiment, conductive structures (e.g., metal traces and vias) are utilized to respectively transmit phase control voltages from the phase control circuit to the variable capacitor terminal that is connected to an associated metamaterial structure (i.e., either by connection to the metamaterial structure such that the metamaterial structure forms part of the transmission line, or by forming the conductive structure such that it directly contacts the variable capacitor terminal, which is preferred). This arrangement further facilitates low-cost manufacturing of the array by way of forming the conductive structures using well-known printed circuit board fabrication techniques, and by allowing automated assembly of the variable capacitors, e.g., using high speed pick-and-place systems.

In accordance with another practical embodiment, the object-detection system further includes circuitry for detecting objects in the target field and generating target location data that can be utilized, for example, by collision avoidance, vehicle guidance or other operating systems coupled to the object detection system. In an exemplary embodiment, the phase control circuit is configured to generate beam direction data indicating an instantaneous beam direction of the scan beam as it scans the target field, receiver circuitry is utilized to detect portions of the scan beam that are reflected from objects disposed in the target field, and signal processing circuitry is utilized to determine the position of the object by correlating beam detection data generated the receiver circuitry with beam direction data generated at the time of detection. In one specific embodiment, the receiver circuitry utilizes a separate antenna or metamaterial array to detect reflected beam portions, and in a second specific embodiment the metamaterial structure array is utilized to perform both transmission and reception functions by operating the array in a manner consistent with known techniques. In either case, the present invention facilitates a low-cost, light weight dynamic phased array system that can be utilized, for example, on automobiles for guidance and collision avoidance.

In accordance with an embodiment of the present invention, the phase shifting element array is a three-layer structure including an electrically isolated (floating) backplane (lower metal) layer, a blanket dielectric layer disposed over the backplane layer, and multiple spaced-apart metal layer "island" structures disposed on an upper surface of the dielectric layer. With this arrangement, each metamaterial structure of the array is formed by one of the metal island structures and an associated backplane layer portion disposed under the metal island structure (i.e., along with an associated portion of the dielectric layer sandwiched therebetween), wherein each metal island structure and its associated backplane layer portion are cooperatively configured (e.g., sized, shaped and spaced) such that the resulting composite metamaterial structure has a fixed capacitance and other attributes that facilitate resonance at the radio wave frequency of the input signal. In addition to facilitating the use of low-cost fabrication techniques, this three-layered structure ensures that the output signals are highly-directional in the upward direction only, and which minimizes power consumption because of efficient scattering with phase shift. In a presently preferred embodiment, the three-layered metamaterial structure arrangement utilizes a lossless dielectric material that mitigates absorption of the input signal (i.e., incident radiation), and ensures that most of the incident radiation is re-emitted in the output signal. In accordance with another feature of the practical embodiment, the metal island structures are co-disposed on an upper surface of the dielectric layer with a base metal (layer) structure, with each variable capacitor connected between its associated metal island structure and the base metal structure (i.e., the base metal structure servers as a common ground terminal). This practical arrangement further reduces manufacturing costs by facilitating attachment of the variable capacitor using low-cost surface-mount technology. In a preferred embodiment, the base metal structure is formed as a metal layer that covers almost the entire upper dielectric surface and defines openings in which the metal island structures are respectively disposed, where the inside peripheral edge of each opening is spaced from the outside peripheral edge of an associated metal island structure by an associated peripheral gap having a uniform width. This base metal layer structure arrangement serves two purposes: first, by providing a suitable peripheral gap distance between the base metal layer and each metal island structure, the base metal layer effectively becomes part of each metamaterial structure (i.e., the fixed capacitance of each metamaterial structure is enhanced by a capacitance component generated between the base metal layer and the metal island structure); and second, by forming the base metal layer in a closely spaced proximity to island structures and otherwise covering the upper array surface, the base metal layer serves as a scattering surface that supports collective mode oscillations, and ensures scattering of the output signals (wave) in the upward/forward direction. In accordance with another feature, both the base metal layer and the metal island structures are formed using a single (i.e., the same) metal (e.g., copper), thereby further reducing fabrication costs by allowing the formation of the base metal layer and the island structures using a low-cost fabrication processes (e.g., depositing a blanket metal layer, patterning, and then etching the metal layer to form the peripheral grooves/gaps). In accordance with yet another preferred embodiment, a metal via structure extends through openings formed through the backplane layer and the dielectric layer, and contact the terminals of each variable capacitor. This arrangement facilitates applying phase control voltages across the variable capacitor without complicating the metamaterial structure shape, and also simplifies distributing multiple phase control signals to multiple phase shifters disposed in phased array structures including multiple phase shifting elements.

According to exemplary embodiments of the invention, each metal island (first metal layer) structure is formed as a planar square structure disposed inside an associated square opening defined in the base metal layer. The square metal island shape provides each metamaterial structure with a simple geometric construction that is easily formed, and provides limited degrees of freedom that simplifies the mathematics needed to correlate phase control voltages with desired capacitance changes and associated phase shifts. However, unless otherwise specified in the claims, it is understood that the metamaterial structures can have any geometric shape (e.g., round, triangular, oblong). In some embodiments, the metal island structures are formed as a patterned planar structure that defines (includes) one or more open regions (i.e., such that portions of the upper dielectric surface are exposed through the open regions). In one exemplary embodiment, each metal island structure includes a (square-shaped) peripheral frame portion, radial arms that extend inward from the frame portion, and an inner (e.g., X-shaped) structure that is connected to inner ends of the radial arms, where open regions are formed between portions of the inner structure and the peripheral frame. Although the use of patterned metamaterial structures may complicate the mathematics associated with correlating control voltage and phase shift values, the patterned approach introduces more degrees of freedom, leading to close to 360° phase swings, which in turn enables beam steering at large angles (i.e., greater than plus or minus 60°).

According to alternative embodiments of the present invention, the phase shifting element array includes multiple metamaterial structures and associated variable capacitors that are arranged in either a one-dimensional array, or in a two-dimensional array, a signal source positioned in the center of the array, and a control circuit. When the metamaterial structures are arranged in a one-dimensional array (i.e., such that metal island structures of each metamaterial structure are aligned in a row), changes in the voltage levels of the phase control voltages produce "steering" of the emitted beam in a fan-shaped two-dimensional region disposed in front of the phase shifting element array. When the metamaterial structures are arranged in a two-dimensional array (e.g., such that the metal island structures are aligned in orthogonally arranged rows and columns), changes in the voltage levels of the phase control voltages produce "steering" of the emitted beam in a cone-shaped three-dimensional region disposed in front of the phase shifting element array.

According to another embodiment, any of the object-detection systems described above are implemented in a vehicle-mounted collision avoidance system that is used to avoid collisions between the host vehicle and one or more external objects in the vehicle's path. The vehicle includes an adaptive cruise control system that, consistent with existing systems, is capable of assuming automated control of the vehicle by way of changing the vehicle's direction (i.e., by controlling the vehicle's steering system) and by stopping or slowing the vehicle (i.e., by controlling the vehicle's braking system). The object-detection system is mounted on the vehicle such that the scan beam emitted from the phase shifting element array is directed into a field located adjacent to the host vehicle (e.g., in front of the vehicle), and such that the emitted beam repeatedly scans (sweeps) across the field. When an object is detected by the signal processing circuit, collision control avoidance data (e.g., data indicating the object's relative position) is sent to the adaptive cruise control system, thereby allowing the adaptive cruise control system to assume automated control of the vehicle in order to avoid collision with the object. An advantage the present invention provides over existing vehicle-mounted collision avoidance systems is that, like phased array radar systems, the metamaterial-based object-detection system is able to locate and track more than one object at a time. In contrast, because conventional phased array systems are two large and expensive to include on automobiles, current vehicle-mounted radar-based collision avoidance systems utilize object-detection schemes that are only capable of tracking one object at a time. According to a practical embodiment, the object-detection system utilizes a one-dimensional array of metamaterial structures that facilitate scanning the typically horizontal surface on which the vehicle travels. However, in some embodiments it may be useful to detect the vertical position or size of an object, in which case a two-dimensional array may be used.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

The present invention relates to an improvement in object-detection (e.g., radar) systems, and to various control systems (e.g., automobile collision avoidance and guidance systems) that utilize the object-detection systems. The following description is presented to enable one of ordinary skill in the art to make and use the invention as provided in the context of a particular application and its requirements. As used herein, directional terms such as "upper", "upward", "uppermost", "lower", "lowermost", "front", "rightmost" and "leftmost", are intended to provide relative positions for purposes of description, and are not intended to designate an absolute frame of reference. In addition, the phrases "integrally formed" and "integrally connected" are used herein to describe the connective relationship between two portions of a single fabricated or machined structure, and are distinguished from the terms "connected" or "coupled" (without the modifier "integrally"), which indicates two separate structures that are joined by way of, for example, adhesive, fastener, clip, or movable joint. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
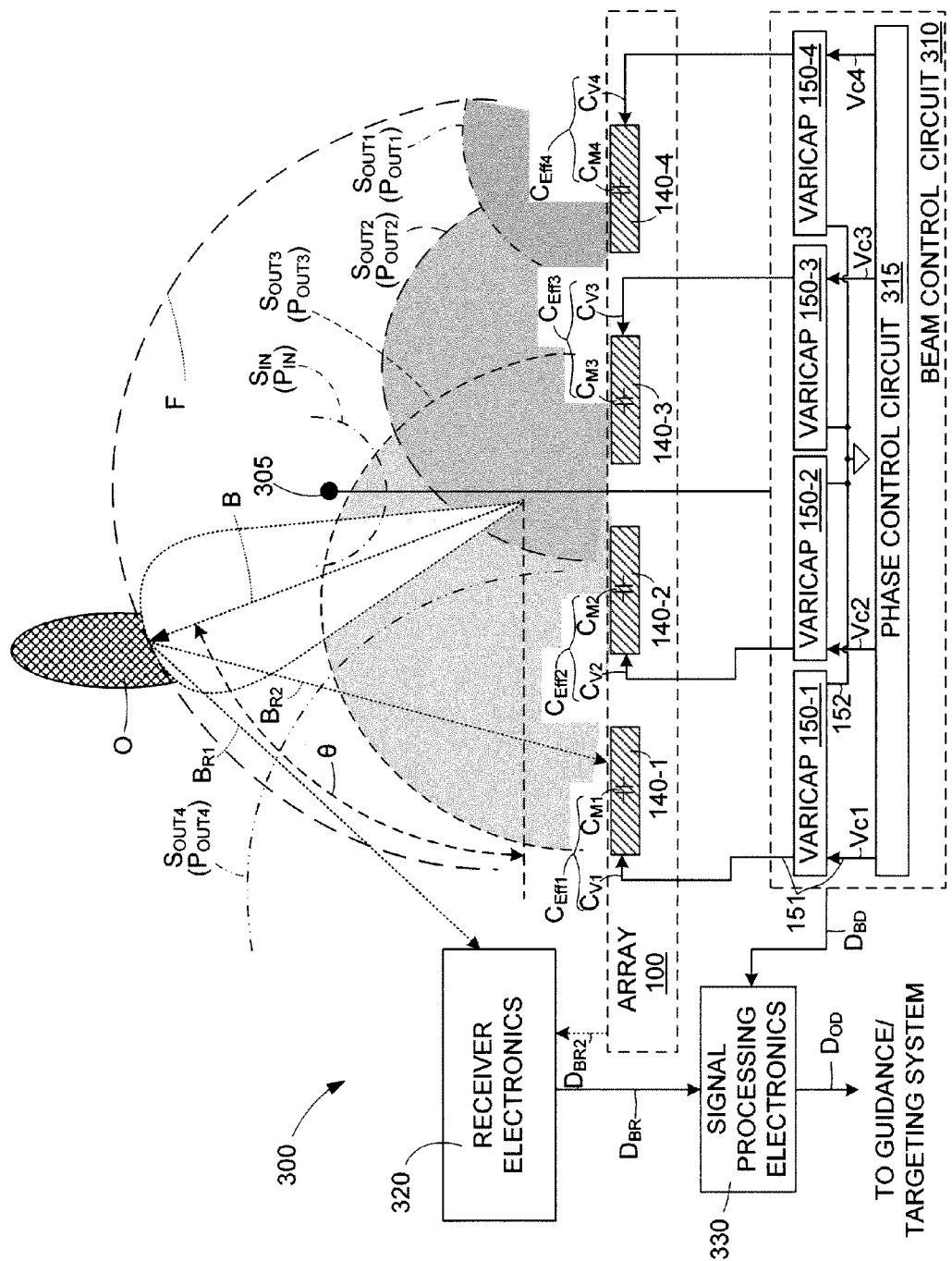
FIG. 1 is a simplified side view showing an object-detection system according to a generalized embodiment of the present invention.

FIG. 1 is a simplified side view diagram showing an object-detection system 300 according to a generalized exemplary embodiment of the present invention. System 300 generally includes a signal source 305, a phase shifting element array 100 and a beam control circuit 310 for generating a scan beam B that is directed into a target field F. System 300 also includes a receiver circuit 320 for processing reflected beam portions $B_R$ from target field F, and a signal processing circuit 330 for processing reflected beam data to determine the position of an object O that might be present in field F.

Signal source 305 is a signal transmission source (e.g., a feed horn or a leaky-wave feed) disposed in close proximity to phase shifting element array 100, and is configured to generate a radio wave frequency input signal $S_{IN}$ at a particular radio wave frequency (i.e., in the range of 3 kHz to 300 GHz) and an input phase $p_{IN}$. As discussed below, the radio wave frequency of input signal $S_{IN}$ is generated to match resonance characteristics of phase shifting element array 100.

According to the exemplary embodiment, phase shifting element array 100 includes four metamaterial structures 140-1 to 140-4, each configured to resonate at the radio wave frequency of input signal $S_{IN}$ such that phase shifting element array 100 generates four output signals $S_{OUT1}$ to $S_{OUT4}$, each having the radio wave frequency and an associated output phase $p_{OUT1}$ to $p_{OUT4}$. For example, when metamaterial structure 140-1 is configured to resonate at 2.4 GHz and input signal $S_{IN}$ is generated at 2.4 GHz, metamaterial structure 140-1 generates output signal $S_{OUT1}$ at 2.4 GHz of by retransmitting (i.e., reflecting/scattering) input signal $S_{IN}$. When all four metamaterial structures 140-1 to 140-4 are configured in this manner and subjected to input signal $S_{IN}$, array 100 produces four separate output signals $S_{OUT1}$ to $S_{OUT4}$, each having a frequency of 2.4 GHz. According to a presently preferred embodiment, metamaterial structures 140-1 to 140-4 are preferably layered metal-dielectric composite architectures, as described with reference to FIGS. 3-5, but may be engineered in a different form, provided the resulting structure is configured to resonate at the radio frequency of applied input signal $S_{IN}$, and has a large phase swing near resonance. In providing this resonance characteristic, metamaterial structures 140-1 to 140-4 are produced with associated inherent "fixed" capacitances $C_{M1}$ to $C_{M4}$ and associated inductances that collectively provide the desired resonance characteristics. As understood in the art, the term "metamaterial" identifies an artificially engineered structure formed by two or more materials and multiple elements that collectively generate desired electromagnetic properties, where metamaterial achieves the desired properties not from its composition, but from the exactingly-designed configuration (i.e., the precise shape, geometry, size, orientation and arrangement) of the structural elements formed by the materials. As used herein, the phrase "metamaterial structure" is intended to mean a dynamically reconfigurable/tunable metamaterial having radio frequency resonance and large phase swing properties suitable for the purpose set forth herein. The resulting structure affects radio frequency (electromagnetic radiation) waves in an unconventional manner, creating material properties which are unachievable with conventional materials. Metamaterial structures achieve their desired effects by incorporating structural elements of sub-wavelength sizes, i.e. features that are actually smaller than the radio frequency wavelength of the waves they affect. Although four metamaterial structures are utilized in the exemplary embodiment, this number is arbitrarily selected for illustrative purposes and brevity, and array 100 may be alternatively produced with any number of metamaterial structures.

According to another aspect, beam control circuit 130 comprises integrated circuitry configured to generate and apply four variable capacitances $C_{V1}$ to $C_{V4}$ onto metamaterial structures 140-1 to 140-4, respectively, such that an effective capacitance of each metamaterial structure is altered by a corresponding change in the applied variable capacitance $C_{V1}$. As mentioned above, each metamaterial structure 140-1 to 140-4 is produced with associated inherent "fixed" (unchanging) capacitances $C_{M1}$ to $C_{M4}$, respectively. The effective capacitance of each metamaterial structure 140-1 to 140-4 is generated by a product of the structure's inherent (fixed) capacitance and an associated applied variable capacitance. For example, metamaterial structure 140-1 has an effective (operating) capacitance $C_{eff1}$ generated by inherent (fixed) capacitance $C_{M1}$ and associated variable capacitance $C_{V1}$, which is applied onto metamaterial structure 140-1 by beam control circuit 130 using techniques described below. Similarly, metamaterial structure 140-2 has an effective (operating) capacitance $C_{\textit{eff}2}$ generated by inherent capacitance $C_{M2}$ and associated applied variable capacitance $C_{V2}$, metamaterial structure 140-3 has an effective (operating) capacitance $C_{\textit{eff}3}$ generated by inherent capacitance $C_{M3}$ and associated applied variable capacitance $C_{V3}$, and metamaterial structure 140-4 has an effective (operating) capacitance $C_{\textit{eff}4}$ generated by inherent capacitance $C_{M4}$ and associated applied variable capacitance $C_{V4}$. The present invention achieves control over output phase $p_{OUT1}$ to $p_{OUT4}$ of radio frequency (output) signals $S_{OUT1}$ to $S_{OUT4}$ without the use of conventional phase shifters simply by controlling variable capacitances $C_{V1}$ to $C_{V4}$ applied to metamaterial structures 140-1 to 140-4.

According to another aspect of the invention, beam control circuit 310 is further configured to coordinate and vary (i.e., change over time) variable capacitances $C_{V1}$ to $C_{V4}$ applied to metamaterial structures 140-1 to 140-4 such that beam B (generated by way of output signals $S_{OUT1}$ to $S_{OUT4}$, collectively) scans, or "sweeps", across target field F at a predetermined rate over a predetermined scan range (pattern). That is, at each instant a particular set of variable capacitances $C_{V1}$ to $C_{V4}$ are applied to metamaterial structures 140-1 to 140-4 such that output signals $S_{OUT1}$ to $S_{OUT4}$ have correspondingly different output phases $p_{OUT1}$ to $p_{OUT4}$ (e.g., output signal $S_{OUT1}$ is generated at output phase $p_{OUT1}$ that is different from output phase $p_{OUT2}$ of output signal $S_{OUT2}$), and output phases $p_{OUT1}$ to $p_{OUT4}$ are coordinated such that output signals $S_{OUT1}$ to $S_{OUT4}$ cumulatively emit scan beam B in a direction determined by the instantaneous set of output phase values. At the beginning of each scan pass, the output phases $p_{OUT1}$ to $p_{OUT4}$ are coordinated such that beam B is directed along an initial direction (e.g., a scan angle of −60°, corresponding to a leftmost beam angle). As understood in the art, by coordinating output phases $p_{OUT1}$ to $p_{OUT4}$ in this way, the combined electro-magnetic wave generated by output signals $S_{OUT1}$ to $S_{OUT4}$ is reinforced in a particular "desired" direction, and suppressed in undesired directions, whereby the scan beam B is emitted at a desired angle from the front of array 100. Output phases $p_{OUT1}$ to $p_{OUT4}$ are subsequently varied such that beam B begins sweeping from the initial direction toward a central direction (i.e., directly in front of array 100, and corresponding to a scan angle of 0°), and then continues to sweep from the central direction to an ending direction (e.g., a scan angle of +60°, corresponding to a rightmost beam angle). The scan rate and repeat/refresh rate at which beam B is generated is determined by the rate at which output phases $p_{OUT1}$ to $p_{OUT4}$ are varied. Beam control circuit 310 generates these output phases $p_{OUT1}$ to $p_{OUT4}$ changes by changing the variable capacitances $C_{V1}$ to $C_{V4}$ applied to metamaterial structures 140-1 to 140-4 over time (e.g., in accordance with predefined time-based functions), whereby beam control circuit 310 causes beam B to scan (sweep) across target field F in a characteristic "radar-like" sweep pattern. By gradually changing the variable capacitances $C_{V1}$ to $C_{V4}$ applied to metamaterial structures 140-1 to 140-4 in a suitable manner, the present invention facilitates radar-like object-detection functionality without using bulky, expensive and power-hungry conventional phase-shifting elements.

According to a presently preferred embodiment, beam control circuit 310 is implemented using variable capacitors (varicaps) 150-1 to 150-4 and a phase control circuit 315, where variable capacitors 150-1 to 150-4 are respectively coupled to metamaterial structures 140-1 to 140-4, and are controlled by way of phase control voltages Vc1 to Vc4 generated by phase control circuit 315 (e.g., variable capacitor 150-1 generates variable capacitance $C_{V1}$ having a capacitance level that is proportional to the voltage level of phase control voltage Vc1). As understood in the art, variable capacitors are typically two-terminal electronic devices configured to produce a capacitance that is intentionally and repeatedly changeable by way of an applied electronic control signal. In this case, variable capacitors 150-1 to 150-4 are coupled to metamaterial structures 140-1 to 140-4 such that respective effective capacitances $C_{\textit{eff}1}$ to $C_{\textit{eff}4}$ of metamaterial structures 140-1 to 140-4 are determined by a product of inherent capacitance $C_{M1}$ to $C_{M4}$ and variable capacitances $C_{V1}$ to $C_{V4}$ supplied by variable capacitors 150-1 to 150-4. For example, effective capacitance $C_{\textit{eff}1}$ of metamaterial structure 140-1 is determined by inherent capacitance $C_{M1}$ and variable capacitance $C_{V1}$, which is supplied to metamaterial structure 140-1 during operation by variable capacitor 150-1. Because output phase $p_{OUT1}$ is determined in part by effective capacitance $C_{\textit{eff}1}$, output signal $S_{OUT1}$ is "tunable" (adjustably controllable) to a desired phase value by way of changing variable capacitance $C_{V1}$, and this is achieved by way of changing the phase control signal Vc1 applied to variable capacitor 150-1.

Figure 2:
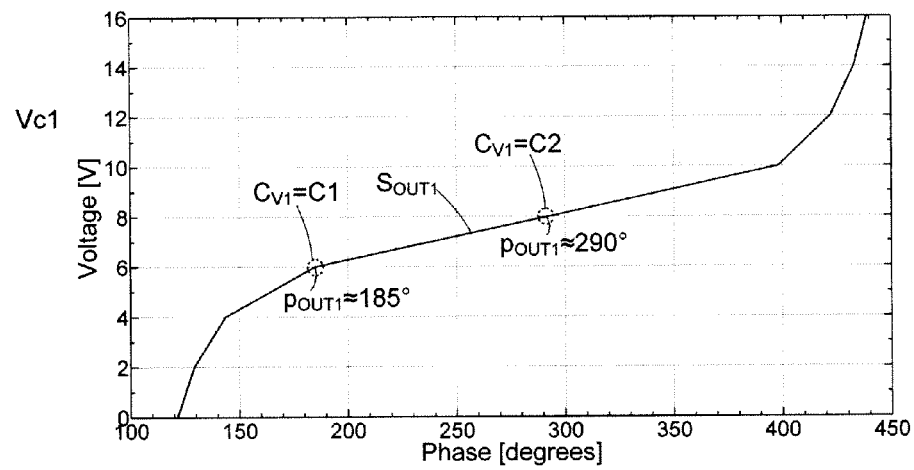
FIG. 2 is a diagram showing exemplary phase shifting characteristics associated with operation of the system of FIG. 1.

FIG. 2 is a diagram showing exemplary phase shifting characteristics associated with operation of system 300. In particular, FIG. 2 shows how output phase $p_{OUT1}$ of output signal $S_{OUT1}$ changes in relation to phase control voltage Vc1. Because output phase $p_{OUT1}$ varies in accordance with effective capacitance $C_{\textit{eff}1}$ of metamaterial structure 140-1 which in turn varies in accordance with variable capacitance $C_{V1}$ applied on metamaterial structure 140-1 by way of beam control circuit 310 (shown in FIG. 1). FIG. 2 also effectively depicts operating characteristics of variable capacitors 150-1 to 150-4 (i.e., FIG. 2 effectively illustrates that variable capacitance $C_{V1}$ of variable capacitor 150-1 varies in accordance with phase control voltage Vc1 by way of showing how output phase $p_{OUT1}$ varies in accordance with phase control voltage Vc1). For example, when phase control voltage Vc1 has a voltage level of 6V, variable capacitor 150-1 generates variable capacitance $C_{V1}$ at a corresponding capacitance level (indicated as "$C_{V1}$=C1") and metamaterial structure 140-1 generates output signal $S_{OUT1}$ at an associated output phase $p_{OUT1}$ of approximately 185°. When phase control voltage Vc1 is subsequently increased from 6V to a second voltage level (e.g., 8V), variable capacitor 150-1 generates variable capacitance at a second capacitance level (indicated as "$C_{V1}$=C2") such that metamaterial structure 140-1 generates output signal $S_{OUT1}$ at an associated second output phase $p_{OUT1}$ of approximately 290°. In a similar manner, variable capacitors 150-2 to 150-4 generate variable capacitances $C_{V2}$ to $C_{V4}$ in a way that varies in accordance with control voltages Vc2 to Vc4, respectively, thereby causing metamaterial structures 140-2 to 140-4 to respectively generate output signals $S_{OUT2}$ to $S_{OUT4}$ with output phases $p_{OUT2}$ to $p_{OUT4}$ that vary in accordance with variable capacitances $C_{V2}$ to $C_{V4}$.

Referring again to FIG. 1, phase control voltages Vc1 to Vc4 are applied across variable capacitors 150-1 to 150-4 such that each variable capacitance $C_{V1}$ to $C_{V4}$ is applied to metamaterial structures 140-1 to 140-4, respectively. For example, variable capacitor 150-1 includes a first terminal 151 connected to metamaterial structure 140-1 and a second terminal 152 connected to ground, whereby variable capacitor 150-1 generates associated variable capacitance $C_{V1}$ having a capacitance level that varies in accordance with the voltage level of phase control voltage Vc1 in the manner illustrated in FIG. 2 (e.g., the capacitance level of variable capacitance $C_{V1}$ changes in direct proportion to phase control voltage Vc1). As indicated in FIG. 1, variable capacitors 150-2 to 150-4 are similarly connected, and share a common voltage source (i.e., ground) with variable capacitor 150-1. In an alternative embodiment, the conductive structures that transmit phase control voltages Vc1 to Vc4 from phase control circuit 315 are either connected to metamaterial structures 140-1 to 140-4, which in turn are connected to associated variable capacitors 150-1 to 150-4.

Referring again to FIG. 1, object-detection system 300 further includes a receiver 320 and signal processing circuitry 330 that are utilized to detecting objects in target field F, and to generate target location data that can be utilized, for example, by collision avoidance, vehicle guidance or other operating systems coupled to object detection system 300. In the exemplary embodiment, phase control circuit 315 is configured to generate beam direction data $D_{BD}$ indicating an instantaneous beam direction θ of said scan beam B as it sweeps the target field F, and receiver circuitry 320 is configured to detect portions $B_R$ of the scan beam B that are reflected from objects disposed in the target field F. Receiver circuitry 320 also generates beam detection data $D_{BR}$ indicating each time a reflected beam portion $B_R$ is detected. Signal processing circuitry 330 is configured to determine the position of each object O in target field F by correlating beam detection data $D_{BR}$ received from receiver circuitry 320 with beam direction data $D_{BD}$ received from beam control circuit 310 at the time of beam portion detection. For example, assume object O is disposed a position corresponding to a −45° direction angle relative to array 100. In this case, as beam B sweeps across field F and passes the −45° direction angle, receiver circuitry 320 generates beam detection data $D_{BR}$ indicating the reception of reflected beam portion $B_R$ caused by the presence of object O, and then signal processing circuitry 330 correlates the reception of this reflected beam portion $B_R$ with beam direction data $D_{BD}$ (i.e., indicating that beam B was directed at −45° when the reflected beam portion was received) to determine the position of object O. Signal processing circuitry 330 also optional circuitry for generating other useful information (e.g., the size of object O and the distance from array 100 to object O) using known signal processing techniques.

Figure 3:
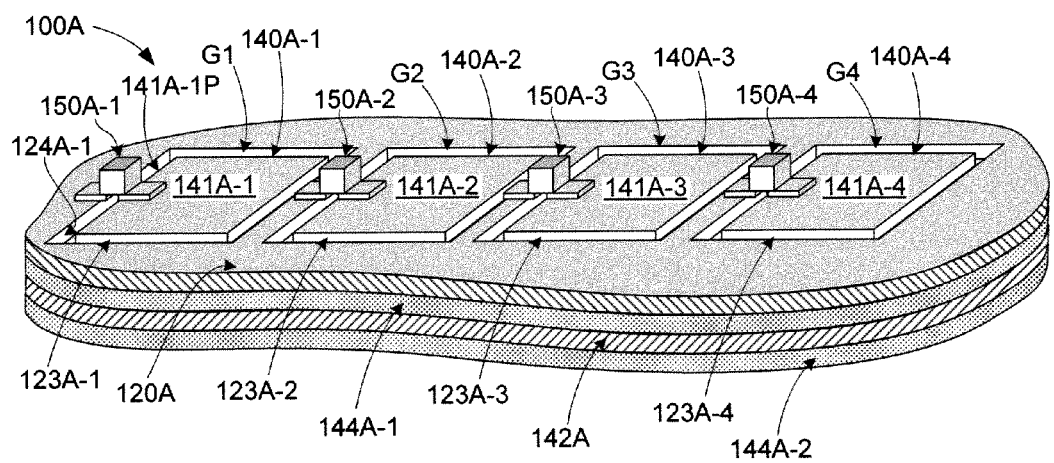
FIG. 3 is a perspective view showing a phase shifting element array including an exemplary metamaterial structures according to an exemplary practical embodiment of the present invention.
Figure 4:
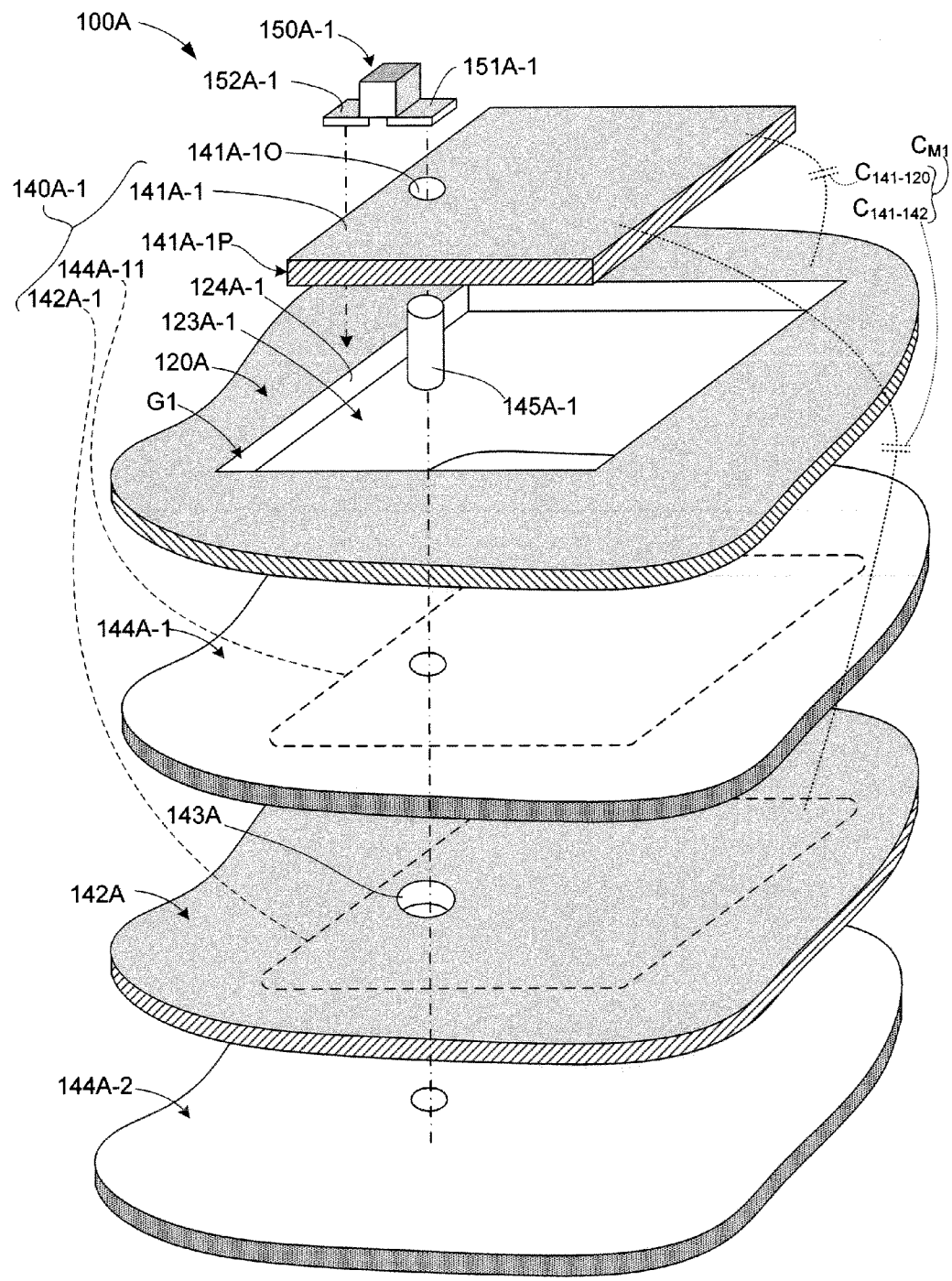
FIG. 4 is an exploded perspective view showing a phase shifting element of the array of FIG. 3 in additional detail.
Figure 5:
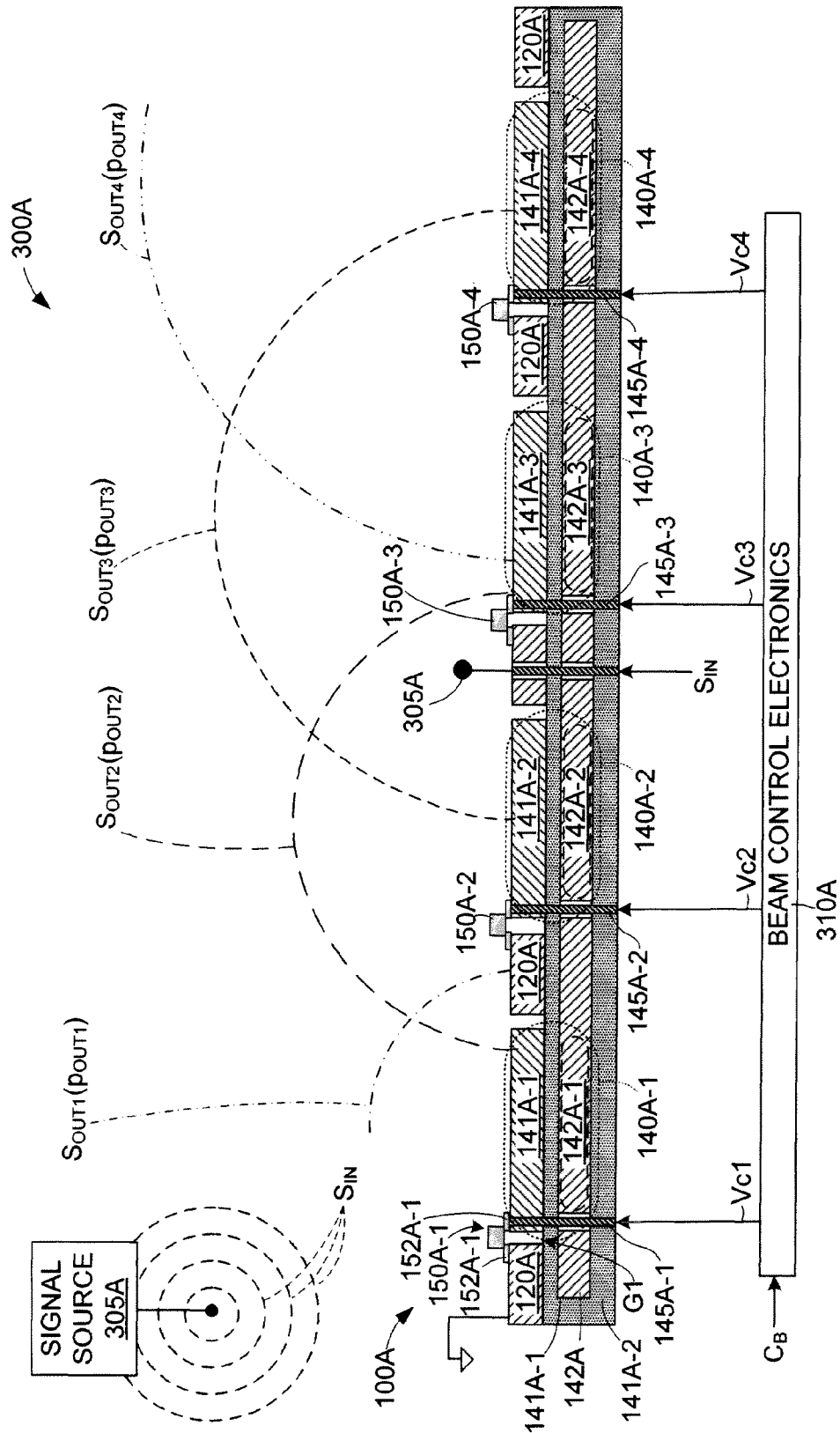
FIG. 5 is a cross-sectional side view showing an object-detection system including the phase shifting element array of FIG. 3 according to another exemplary embodiment of the present invention.

As mentioned above, a presently preferred embodiment of the present invention involves the use of layered metamaterial structures, such as those described below with reference to FIGS. 3 to 5, where FIG. 3 is a perspective view showing an exemplary multi-layer phase shifting element array 100A including multiple (in this case four) metamaterial structures 140A-1 to 140A-4 disposed in a one-dimensional pattern, FIG. 4 is a partial exploded perspective view showing a single metamaterial structure 140A-1 in additional detail, and FIG. 5 is a simplified diagram showing an object-detection system 300A that utilizes phase shifting element array 100A. Additional features and aspects of metamaterial structures formed in accordance with phase shifting element array 100A are provided in co-owned and co-pending U.S. patent application Ser. No. 14/330,977, entitled METAMATERIAL-BASED PHASE SHIFTING ELEMENT AND PHASED ARRAY, which is incorporated herein by reference in its entirety.

As indicated in FIGS. 3 and 4, the multi-layered structure forming phase shifting element array 100A includes an electrically isolated (floating) backplane (lower metal) layer 142A, a blanket upper dielectric layer 144A-1 disposed over backplane layer 142A, an optional lower dielectric layer 144A-2 disposed under backplane layer 142A, and spaced-apart metal layer "island" structures 141A-1 to 141A-4 disposed on an upper surface of the dielectric layer 144A-1. With this arrangement, metamaterial structures 140A-1 to 140A-4 are formed by an associated metal island structure 141A-1 to 141A-4, an associated portion of backplane layer 142A (i.e., the portions disposed under metal island structures 141A-1 to 141A-4, respectively), and an associated portion of upper dielectric layer 144A-1 (i.e., the dielectric portion sandwiched between each metal island structure 141A-1 to 141A-4 and backplane layer 142A). For example, as shown in FIG. 4, metamaterial structure 140A-1 includes metal island structure 141A-1, associated backplane layer portion 142A-1, and upper dielectric layer portion 144A-11. Referring to FIG. 5, metamaterial structures 140A-2 to 140A-4 are similarly formed by metal island structures 141A-2 to 141A-4 and associated backplane layer portions 142A-2 to 141A-4. Metal island structures 141A-1 to 141A-4, backplane layer 142A and upper dielectric layer 144A-1 are cooperatively configured (e.g., sized, shaped and spaced) such that associated fixed capacitances $C_{M1}$ to $C_{M4}$ of metamaterial structures 140A-1 to 140A-4 are at least partially formed by the capacitance components formed between the metal island and backplane structures. For example, as indicated in FIG. 4, metal island structure 141A-1 and backplane layer 142A are cooperatively configured such that associated fixed capacitance $C_{M1}$ is at least partially formed by capacitance component $C_{141\text{-}142}$.

According to a presently preferred embodiment, dielectric layer 144A-1 comprises a lossless dielectric material selected from the group including RT/Duroid® 6202 Laminates, Polytetrafluoroethylene (PTFE), and TMM4® dielectric, all produced by Rogers Corporation of Rogers, Conn. The use of such lossless dielectric materials mitigates absorption of incident radiation (e.g., input signal $S_{IN}$), and ensures that most of the incident radiation energy is re-emitted in output signal $S_{OUT}$. Optional lower dielectric layer 144A-2, which functions to further isolate backplane structure 142A and to facilitate the backside mounting of control circuits in the manner described below, is also produced using lossless dielectric material.

According to another feature, both metal island structures 141A-1 to 141A-4 and a base metal layer 120A are co-disposed on an upper surface of dielectric layer 141A-1, where base metal layer 120A is spaced from metal island structures 141A-1 to 141A-4 (e.g., metal island structure 141A-1 is separated from metal layer structure 120A by gap G1). Base metal layer 120A is connected to a ground potential during operation, whereby base metal layer 120A facilitates low-cost mounting of variable capacitors 150A-1 to 150A-4 during manufacturing. For example, as indicated in FIGS. 4 and 5, variable capacitor 150A-1 is mounted across gap G1 such that first terminal 151A-1 is connected (e.g., by way of solder or solderless connection techniques) to island structure 141A-1, and such that second terminal 152A-1 is similarly connected to base metal layer 120A. This practical arrangement further reduces manufacturing costs by facilitating attachment of the variable capacitors 150A-1 to 150A-4 using low-cost surface-mount technology.

As indicated in FIGS. 3 and 4, in the preferred embodiment, base metal layer 120A covers almost the entire upper surface of dielectric layer 144A-1, and is patterned to define openings 123A-1 to 123A-4 in which metal island structures 141A-1 to 141A-4 are respectively disposed. As indicated in FIG. 4, inside peripheral edge 124A-1 of opening 123A-1 is spaced from outside peripheral edge 144A-1 of associated metal island structure 141A-1 by associated peripheral gap G1, which has a uniform width. As indicated in FIG. 3, metal island structures 141A-2 to 141A-4 are similarly disposed inside openings 123A-2 to 123A-4, respectively, with gaps G2 to G4 formed therebetween. This base metal structure arrangement serves two purposes. First, by providing a suitable peripheral gap distance between base metal layer 120A and metal island structures 141A-1 to 141A-4, base metal layer 120A effectively becomes part of metamaterial structures 140A-1 to 140A-4 in that the fixed capacitances $C_{M1}$ to $C_{M4}$ of metamaterial structures 140A-1 to 140A-4 are enhanced by a capacitance component generated between the base metal layer 120A and the metal island structures 141A-1 to 141A-4 (e.g., as indicated in FIG. 4, fixed capacitance $C_{M1}$ includes capacitance component $C_{141\text{-}120}$). Second, by forming base metal layer 120A in a closely spaced proximity to island structures 141A-1 to 141A-4 and otherwise covering the upper surface of dielectric layer 144A-1 (i.e., the upper or "front" surface of array 100A), base metal layer 120A serves as a scattering surface that supports collective mode oscillations, and ensures scattering of the output signals in the upward/forward direction. In accordance with another feature, both base metal layer 120A and metal island structures 141A-1 to 141A-4 are formed using a single (i.e., the same) metal (e.g., copper), thereby further reducing fabrication costs by allowing the formation of base metal layer 120A and the island structures 141A-1 to 141A-4 using a low-cost fabrication processes (e.g., sputter depositing a blanket metal layer, patterning a resist, and then etching the metal layer to form the peripheral grooves/gaps).

Referring to FIG. 5, according to yet another aspect of the preferred embodiment, metal via (conductive) structures 145A-1 to 145-2 extend through dielectric layers 144A-1 and 144A-2 and through openings formed in backplane layer 142A that serve to transmit phase control voltages Vc1 to Vc4 from beam control circuit 310A to variable capacitors 150A-1 to 150A-4, respectively. As illustrated in FIG. 4, metal via structure 145A-1 extends through opening 143A, which is formed in backplane layer 142A and sized such that metal via structure 145A-1 is electrically isolated from backplane layer 142A (i.e., such that backplane layer 142A is not affected by phase control voltage Vc1 applied to metal via structure 145A-1). In the preferred embodiment, metal via structure 145A-1 passes through a second opening 141A-10 formed in metal island structure 141A-1 such that its upper end contacts terminal 151A-1 of variable capacitor 150A-1, thereby facilitating transmission of phase control voltage Vc1 with minimal signal loss. In an alternative embodiment (not shown), each metal via structure contacts its associated metal island structure (e.g., metal via structure 145A-1 contacts the lower surface of metal island structure 141A-1), and the phase control voltages are transmitted through the metal island structures to the associated variable capacitors. The use of metal via structures 145A-1 to 145A-4 facilitates the distribution of phase control voltages Vc1 to Vc4 to variable capacitors 150A-1 to 150A-4 without complicating the shape of metamaterial structures 140A-1 to 140A-4, and also simplifies distributing phase control voltages to a large number of metamaterial structures.

Figure 6:
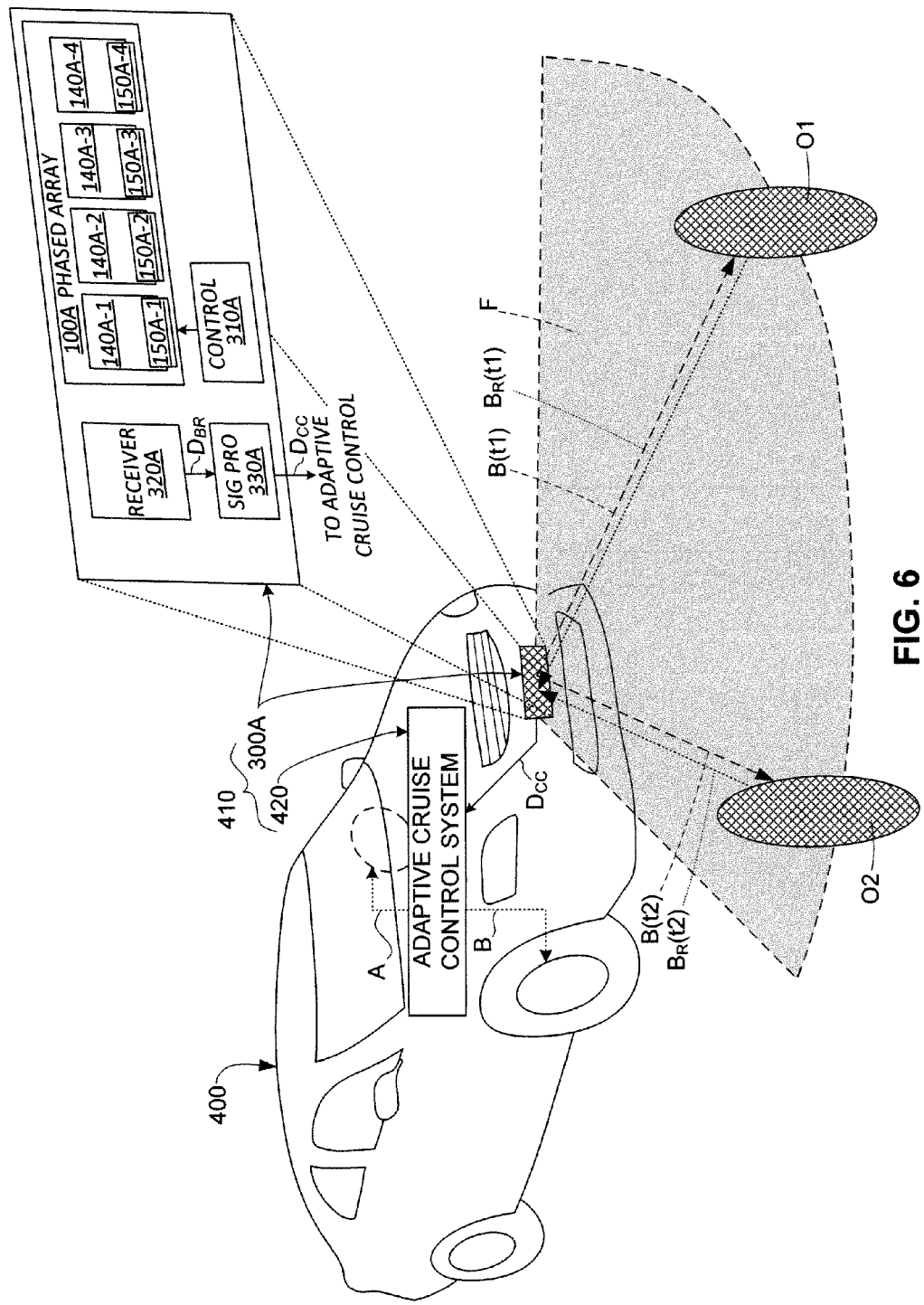
FIG. 6 is a perspective side view showing an automobile having a collision avoidance system utilizing an object-detection system of the present invention according to another embodiment of the present invention.

FIG. 6 is a simplified diagram showing a host vehicle 400 including a vehicle-mounted collision avoidance system 410 formed by object-detection systems 300A (described above) and an adaptive cruise control system 420 that functions in a manner consistent with existing systems having collision avoidance capabilities. Specifically, as indicated by arrows A and B on vehicle 400, adaptive cruise control system 420 is capable of assuming automated control of the vehicle by way of changing the vehicle's direction (i.e., by controlling the vehicle's steering system, indicated by arrow A) and by stopping or slowing the vehicle (i.e., by controlling the vehicle's braking system, indicated by arrow B). In this embodiment, object-detection system 300A is mounted on the front end of vehicle 400 such that the scan beam emitted from the phase shifting element array 100A is directed into and repeatedly scans (sweeps) across a field F located in front of host vehicle 400. When objects (e.g., objects O1 and O2) are located in field F, reflected beam portions are detected by receiver circuit 320A, which transmits reflected beam data $D_{BR}$ to signal processing circuit 330A, which in turn generates collision control avoidance data $D_{CC}$ (e.g., data indicating the relative positions of objects O1 and O2) that is sent to adaptive cruise control system 410, thereby allowing adaptive cruise control system 410 to assume automated control of vehicle 400 in order to avoid collision with objects O1 and O2.

According to an aspect of the present invention, the various metamaterial-based object-detection systems described herein provide a significant advantage over existing vehicle-mounted collision avoidance systems. That is, like phased array radar systems, the metamaterial-based object-detection systems of the present invention are able to locate and track more than one object at a time. In contrast, because conventional phased array systems are two large and expensive to include on automobiles, current vehicle-mounted radar-based collision avoidance systems utilize object-detection schemes that are only capable of tracking one object at a time. According to a practical embodiment, object-detection system 300A utilizes a one-dimensional array of metamaterial structures that facilitate scanning the typically horizontal surface on which host vehicle 400 travels. However, in some embodiments it may be useful to detect the vertical position or size of an object, in which case an object-detection system including a two-dimensional array (e.g., such as system 300E, described below) may be utilized. Accordingly, the present invention facilitates vehicle-based radar-assisted driving/collision avoidance systems that are capable of discriminating between various objects (cars, pedestrians, motorcycles, etc. . . . ), including mapping out the various object's relative speeds and locations. This functionality allows full mapping of traffic patterns and significantly increases the odds of anticipating and preventing accidents, and is achieved at higher performance, lower cost, and lower SWaP (size, weight and power) than existing automotive radar systems.

Those skilled in the art understand that the metamaterial structures generally described herein can take many forms and shapes, provided the resulting structure resonates at a required radio wave frequency, and has a large phase swing near resonance. The embodiment shown in FIGS. 3 to 5 utilizes simplified square-shaped metamaterial structures and solid island structures 141A-1 to 141A-4 to illustrate basic concepts of present invention. Specifically, metamaterial structures 140A-1 to 140A-4 are formed such that the inner peripheral edges surrounding openings 123A-1 to 123A-4 in base metal layer 120A and the outer peripheral edges of island structures 141A-1 to 141A-4 comprise concentric square shapes such that a common width of peripheral gaps G1 to G4 remains substantially constant around the entire perimeter of each island structure. An advantage of using such square-shaped structures is that this approach simplifies the geometric construction and provides limited degrees of freedom that simplify the mathematics needed to correlate phase control voltages with desired capacitance change and associated phase shift. In alternative embodiments, metamaterial structures are formed using shapes other than squares (e.g., round, triangular, rectangular/oblong).

Figure 7:
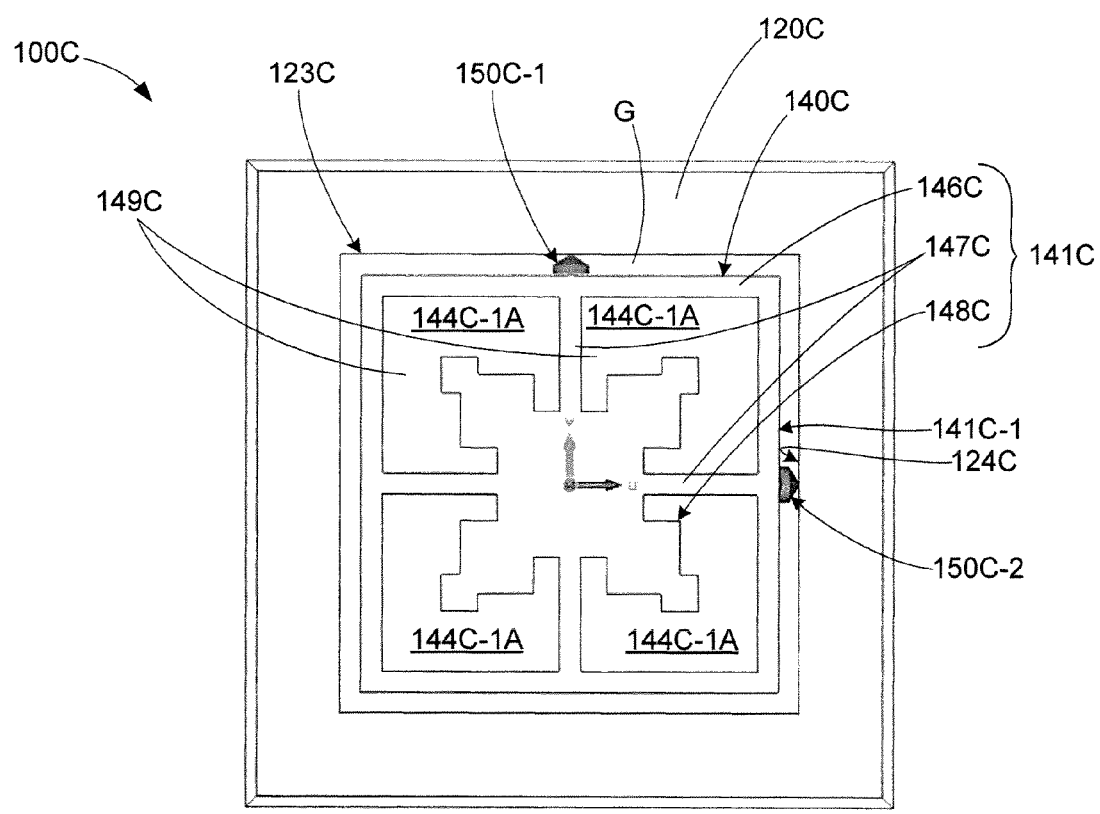
FIG. 7 is a top plan view showing a phase shifting element including a patterned island structure according to another embodiment of the present invention.

FIG. 7 is a perspective view showing a single metamaterial structure 140C of another alternative phase shifting element array 100C that differs from previous embodiments in that metamaterial structure 140C includes a patterned island structure 141C. Specifically, island structure 141C is formed by a patterned planar metal structure that defines open regions 149C (i.e., such that portions of upper dielectric surface 144C-1A are exposed through open regions 149C). In this example, island structure 141C includes a square-shaped peripheral frame portion 146C including an outer peripheral edge 141C-1 that is separated by a peripheral gap G from an inner peripheral edge 124C of base metal layer 120C, which is formed as described above, four radial arms 147C having outer ends integrally connected to peripheral frame portion 146C and extending inward from frame portion 146C, and an inner (in this case, "X-shaped") structure 148C that is connected to inner ends of radial arms 147C. Structure 148C extends into open regions 149C, which are formed between radial arms 147C and peripheral frame 146C. Metamaterial structure 140C is otherwise understood to be constructed using the three-layer approach described above with reference to FIGS. 3 to 5. Although the use of patterned metamaterial structures may complicate the mathematics associated with correlating control voltage and phase shift values, the X-shaped pattern utilized by metamaterial structure 140C is presently believed to produce more degrees of freedom than is possible using solid island structures, leading to close to 360° phase swings, which in turn enables advanced functions such as beam steering at large angles (i.e., greater than plus or minus 60°). In addition, although metamaterial structure 140C is shown as having a square-shaped outer peripheral edge, patterned metamaterial structures having other peripheral shapes may also be beneficially utilized.

Phase shifting element array 100C (FIG. 7) also differs from previously described embodiments in that it includes two variable capacitors 150C-1 and 150C-2 that are connected between metal island structure 141C of metamaterial structure 140C and base metal layer 120C. The configuration and purpose of variable capacitors 150E is the same as that provided above, where utilizing two variable capacitors increases the range of variable capacitance applied to each metamaterial structure.

Figure 8:
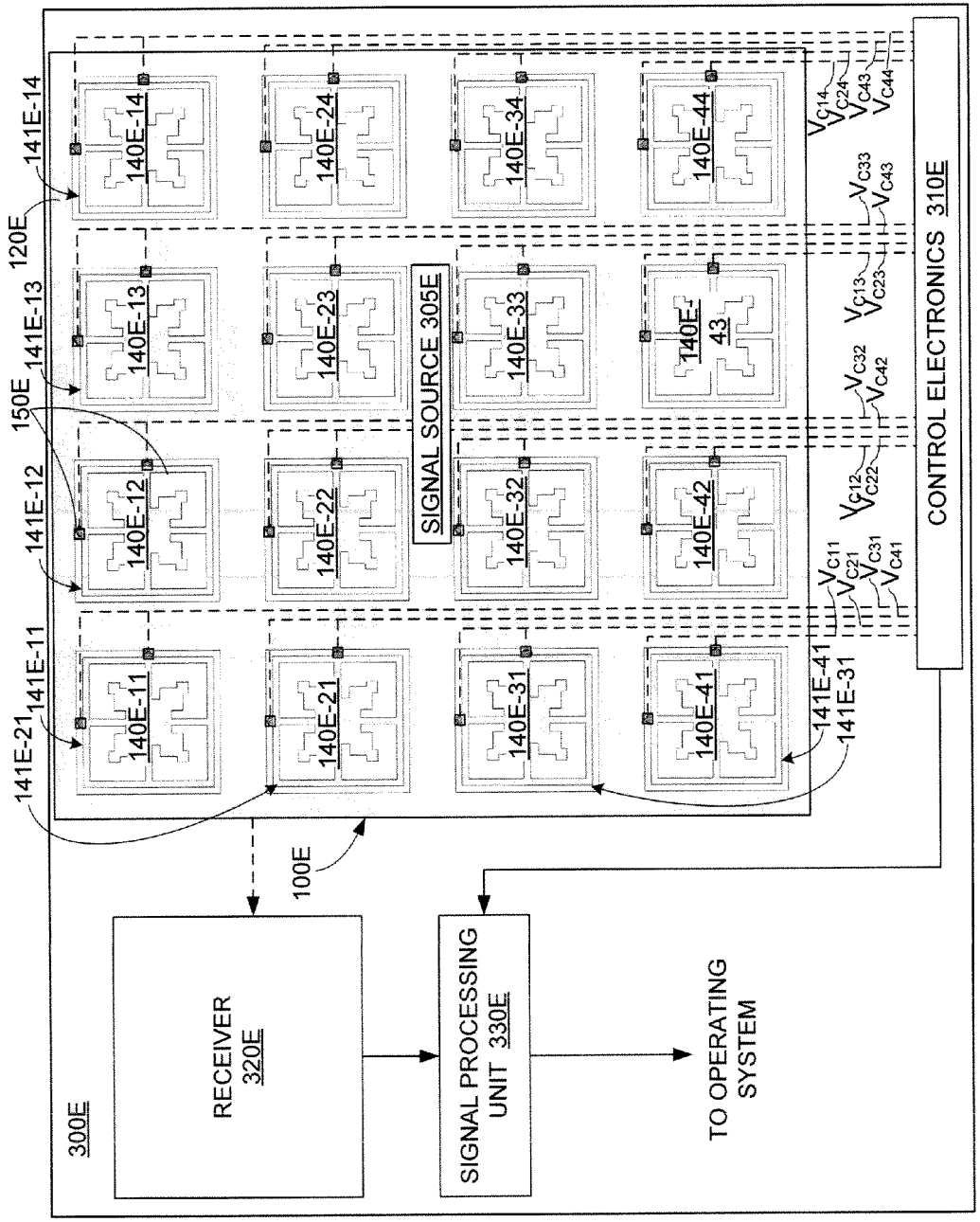
FIG. 8 is a simplified diagram showing an object-detection system including a two-dimensional phase shifting element array according to another embodiment of the present invention.

FIG. 8 is simplified top view showing an object-detection system 300E including a phase shifting element array 100E having sixteen metamaterial structures 140E-11 to 140E-44 surrounded by a base metal layer 120E, a centrally located signal source 305E, and a control circuit 310E (which is indicated in block form for illustrative purposes, but is otherwise disposed below metamaterial structures 140E-11 to 140E-44), a receiver circuit 320E and a signal processing unit 330E that function in a manner consistent with the description provided above.

According to an aspect of the present embodiment, metamaterial structures 140E-11 to 140E-44 are disposed in a two-dimensional pattern of rows and columns, and each metamaterial structure 140E-11 to 140E-44 is individually controllable by way of control voltages $V_{C11}$ to $V_{C44}$, which are generated by control circuit 310E and transmitted by way of conductive structures (depicted by dashed lines) in a manner similar to that described above. Specifically, uppermost metamaterial structures 140E-11, 140E-12, 140E-13 and 140E-14 form an upper row, with metamaterial structures 140E-21 to 140E-24 forming a second row, metamaterial structures 140E-31 to 140E-34 forming a third row, and metamaterial structures 140E-41 to 140E-44 forming a lower row. Similarly, leftmost metamaterial structures 140E-11, 140E-21, 140E-31 and 140E-41 form a leftmost column controlled by control voltages $V_{C11}$, $V_{C21}$, $V_{C31}$ and $V_{C41}$, respectively, with metamaterial structures 140E-12 to 140E-42 forming a second column controlled by control voltages $V_{C12}$ to $V_{C42}$, metamaterial structures 140E-13 to 140E-43 forming a third column controlled by control voltages $V_{C13}$ to $V_{C43}$, and metamaterial structures 140E-14 to 140E-44 forming a fourth (rightmost) column controlled by control voltages $V_{C14}$ to $V_{C44}$.

According to an aspect of the present embodiment, two variable capacitors 150E are connected between each metamaterial structure 140E-11 to 140E-44 and base metal layer 120E. The configuration and purpose of variable capacitors 150E is the same as that provided above, where utilizing two variable capacitors increases the range of variable capacitance applied to each metamaterial structure. In the illustrated embodiment, a single control voltage is supplied to both variable capacitors of each metamaterial structure, but in an alternative embodiment individual control voltages are supplied to each of the two variable capacitors of each metamaterial structure. In addition, a larger number of variable capacitors may be used.

Figure 9A:
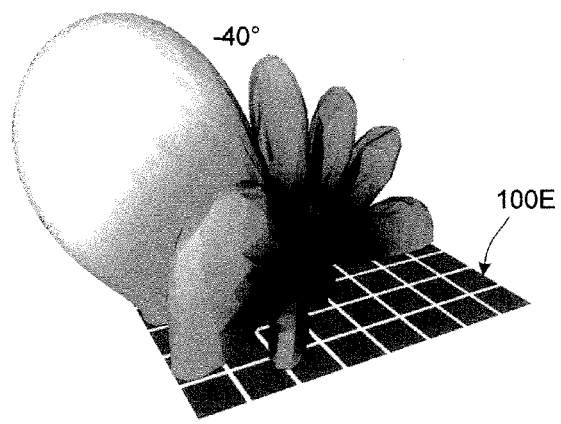
FIGS. 9(A), 9(B) and 9(C) are diagrams depicting emitted beams generated in various exemplary directions by the object-detection system of FIG. 8.
Figure 9B:
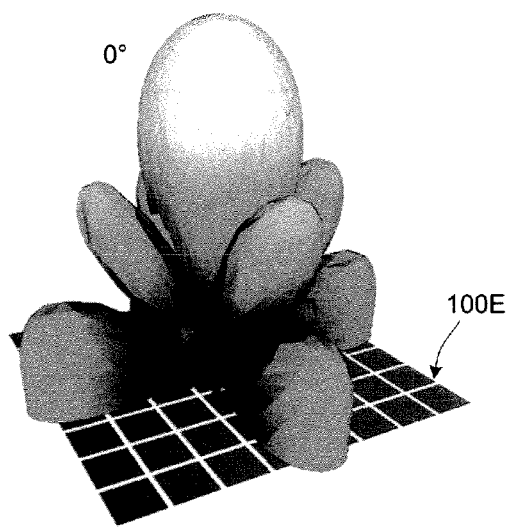
Figure 9C:
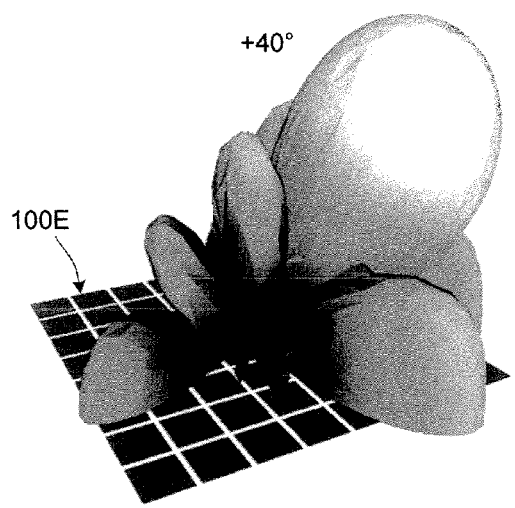

Control circuit 310E is configured to generate phase control voltages $V_{c11}$ to $V_{c44}$ that are transmitted to variable capacitors 150E of each metamaterial structure 140E-11 to 140E-44, respectively, such that variable capacitors 150E are controlled to apply associated variable capacitances to generate associated output signals having individually controlled output phases. According to an aspect of the present embodiment, because metamaterial structures 140E-11 to 140E-44 are arranged in a two-dimensional array (i.e., in rows and columns), variations in output phases cause resulting beams to change direction in an area defined by a three-dimensional region, shown in FIGS. 9(A) to 9(C). Specifically, FIGS. 9(A), 9(B) and 9(C) are diagrams depicting the radiation pattern at 0, +40 and −40 degrees beam steer. The radiation pattern consists of a main lobe and side lobes. The side lobes represent unwanted radiation in undesired directions.

Figure 10:
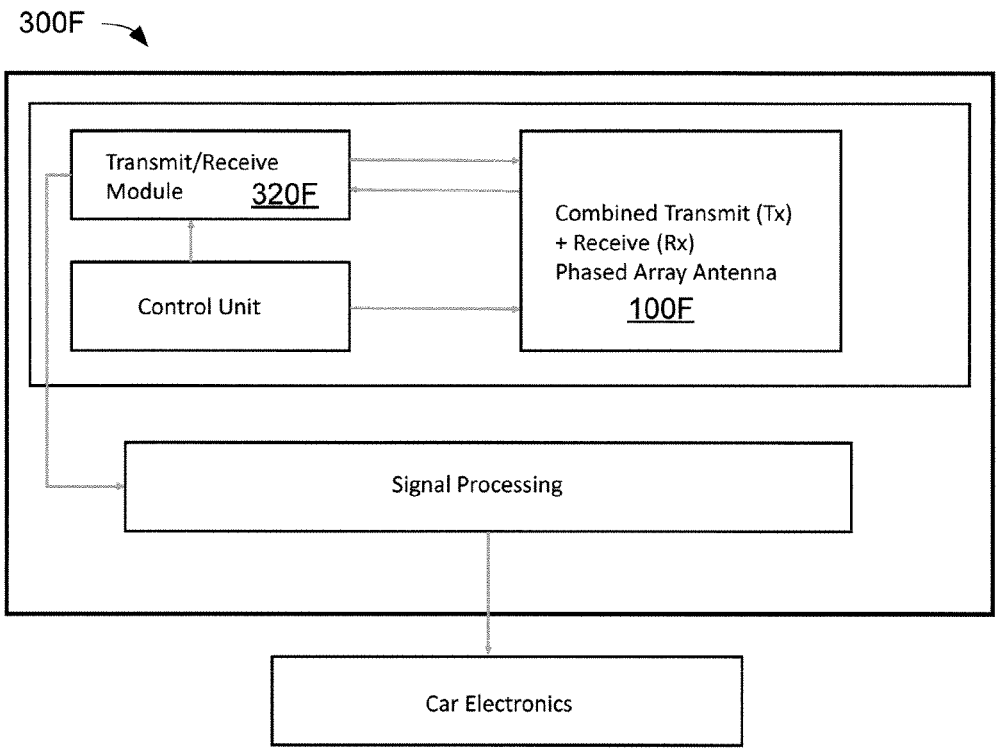
FIG. 10 is a simplified diagram showing an object-detection system according to another embodiment of the present invention.
Figure 11:
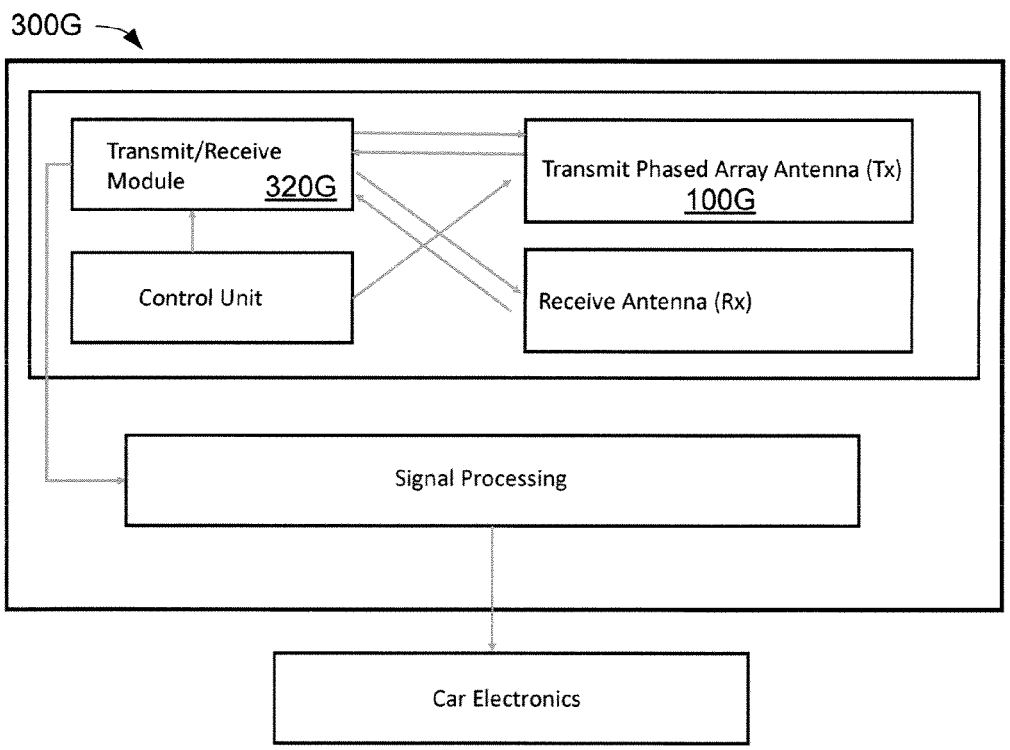
FIG. 11 is a simplified diagram showing an object-detection system according to another embodiment of the present invention.
Figure 12:
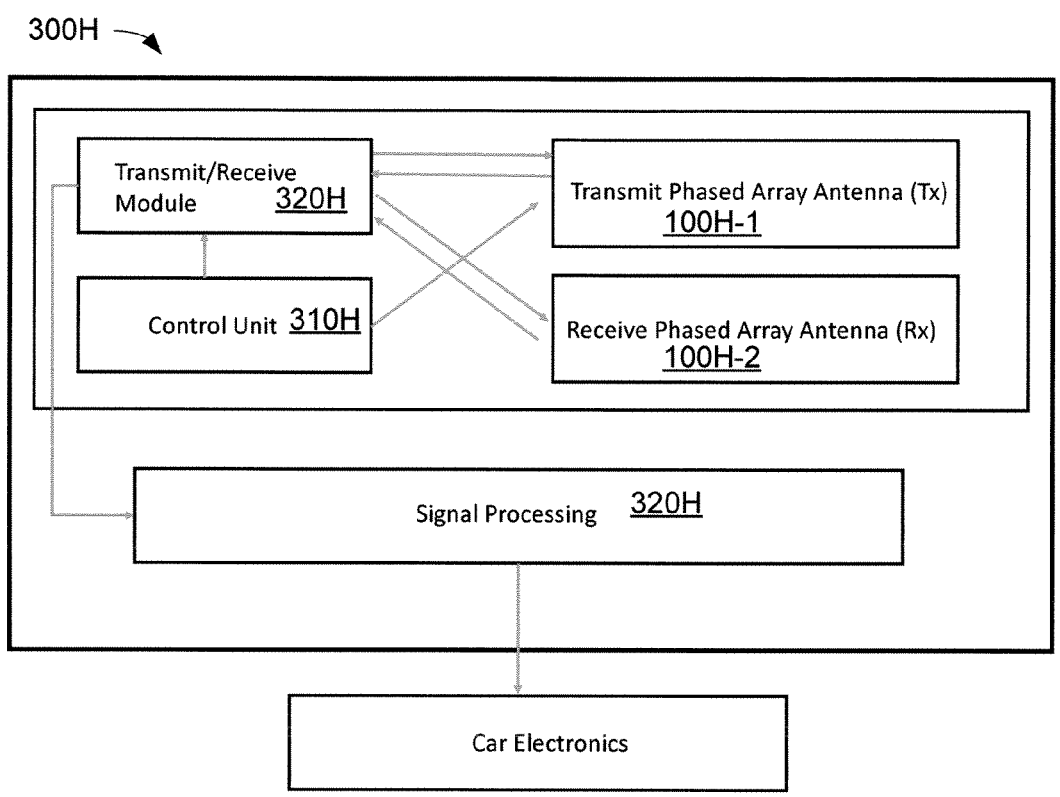
FIG. 12 is a simplified diagram showing an object-detection system according to another embodiment of the present invention.

FIGS. 10, 11 and 12 show object-detection systems 300F, 300G and 300H according to three simplified examples that illustrate alternative receiver circuit functionalities utilized in conjunction with the phase shifting element array and associated beam control and signal processing electronics described above. FIG. 10 shows an object-detection system 300F in which a single phase shifting element array 100F is utilized to both transmit and receive radio frequency signals in a manner consistent with known techniques, whereby transmit/receiver circuit 320F is configured to communicate with array 100F during both beam generation and reflected beam detection operations. FIG. 11 shows an object-detection system 300G in which a phase shifting element array 100G is utilized only for beam transmission, and a separate receive antenna is utilized for reflected beam detection, where transmit/receiver circuit 320G is configured accordingly. Finally, FIG. 12 shows an object-detection system 300H in which two phase shifting element arrays 100H-1 and 100H-2 are respectively utilized for beam transmission and reflected beam detection operations, where transmit/receiver circuit 320G is configured to communicate with both phase shifting element arrays.

Although the present invention has been described with respect to certain specific embodiments, it will be clear to those skilled in the art that the inventive features of the present invention are applicable to other embodiments as well, all of which are intended to fall within the scope of the present invention.

The invention claimed is:

1. An object-detection system comprising:
a signal source configured to generate an input signal having a radio wave frequency in the range of 2.4 GHz to 300 GHz;
a phase shifting element array including a plurality of metamaterial structures, each said metamaterial structure configured to resonate at said radio wave frequency in response to said input signal such that said plurality of metamaterial structures respectively generate electromagnetic radiation output signals having said radio wave frequency by way of retransmitting said input signal; and
a beam control circuit configured to generate a plurality of variable capacitances and to apply each said variable capacitance to an associated said metamaterial structure such that an effective capacitance of said associated metamaterial structure is altered by a corresponding change in each said applied variable capacitance, whereby said plurality of metamaterial structures respectively generate said electromagnetic radiation output signals at corresponding output phases determined by said plurality of variable capacitances, wherein said beam control circuit is further configured to vary said plurality of variable capacitances such that said output signals collectively generate a scan beam that sweeps across a field disposed in front of said phase shifting element array.

2. The object-detection system according to claim 1, wherein the beam control circuit comprises:
a plurality of variable capacitors configured to respectively generate associated variable capacitances, each said variable capacitor being coupled to an associated metamaterial structure of said plurality of metamaterial structures such that an effective capacitance of said associated metamaterial structure is altered by a corresponding change in the variable capacitance generated by said each variable capacitor; and
a phase control circuit configured to generate a plurality of phase control voltages, each phase control voltage being applied to an associated variable capacitor of said plurality of variable capacitors such that said associated variable capacitance of said associated variable capacitor varies in accordance with said each phase control voltage, and each phase control voltage having a respective voltage level that varies over time such that said plurality of metamaterial structures respectively generate said output signals at a plurality of different output phases respectively coordinated to cause said scan beam to sweep across the field.

3. The object-detection system of claim 2, wherein each said variable capacitor is configured such that:
when said phase control voltage applied across said each variable capacitor has a first voltage level, said each variable capacitor generates said variable capacitance at a first capacitance level and said associated metamaterial structure generates said output signal at an associated first output phase, and
when said phase control voltage is increased from said first voltage level to a second voltage level, said each variable capacitor generates said variable capacitance at a second capacitance level such that said associated metamaterial structure generates said output signal at an associated second output phase, said second output phase being greater than said first output phase.

4. The object-detection system of claim 2,
wherein each said variable capacitor includes a first terminal and a second terminal, said first terminal connected to said associated metamaterial structure, and
wherein said second terminal of all of said plurality of variable capacitors is connected to a common voltage source.

5. The object-detection system of claim 2, further comprising a plurality of conductive structures for respectively transmitting said plurality of phase control voltages, each said conductive structure connected between said phase control circuit and one of an associated metamaterial structure and said first terminal of said associated variable capacitor, whereby when one of said phase control voltages is applied by way of said each conductive structure and said second terminal of said associated variable capacitor is connected to a ground potential, said associated variable capacitor generates said associated variable capacitance having a capacitance level that is proportional to said phase control voltage.

6. The object-detection system according to claim 2,
wherein said beam control circuit is further configured to generate beam direction data indicating an instantaneous beam direction of said scan beam,
wherein said object-detection system further comprises:
a receiver configured to detect beam portions of said scan beam that are reflected from objects disposed in said field, and configured to generate beam detection data indicating each detection of an associated reflected said beam portion, and
signal processing circuitry configured to detect the position of an object in said field by combining said beam direction data with said beam detection data generated by reflection of said scan beam from said object.

7. The object-detection system of claim 2, wherein said phase shifting element array further comprises:
an electrically isolated lower metal layer; and
a dielectric layer disposed over the lower metal layer,
wherein each said metamaterial structure includes a metal island structure disposed on the dielectric layer and an associated lower layer portion of said lower metal layer, said associated lower layer portion being disposed directly under said metal island structure, and
wherein said metal island structure and said associated lower layer portion of each said metamaterial structure are cooperatively configured such that said each metamaterial structure resonates at said radio wave frequency and has said fixed capacitance.

8. The object-detection system of claim 7, wherein said dielectric layer comprises a dielectric material.

9. The object-detection system of claim 7,
wherein said phase shifting element array further comprises a base metal structure disposed on said upper dielectric surface and spaced from each said metal island structure of said plurality of metamaterial structures, and
wherein each said variable capacitor of said plurality of variable capacitors includes a first terminal connected to said metal island structure of said associated metamaterial structure and a second terminal connected to said base metal structure.

10. The object-detection system of claim 9,
wherein said base metal structure defines a plurality of openings, each said opening having an inner peripheral edge,
wherein each said metal island structure is disposed inside an associated opening of said plurality of openings such that an outer peripheral edge of said metal island structure is separated from the inner peripheral edge of said base metal structure by a peripheral gap configured such that said metal island structures of each of the plurality of metamaterial structures resonates at said radio wave frequency.

11. The object-detection system of claim 10, wherein said base metal structure and said metal island structures comprise a single metal.

12. The phased array apparatus of claim 7, wherein said phase shifting element array further comprises a plurality of metal via structures, each said metal via structure extending through the dielectric layer and contacting the first terminal of an associated variable capacitor of said plurality of variable capacitors.

13. The object-detection system of claim 7, wherein said metal island structure of each of said plurality of metamaterial structures comprises a square peripheral edge.

14. The phased array apparatus of claim 7, wherein said metal island structure of each of the plurality of metamaterial structures comprises a patterned planar structure defining one or more open regions.

15. The phased array apparatus of claim 7,
wherein said plurality of metamaterial structures are arranged in a one-dimensional array such that said metal island structures are aligned in a row, and
wherein said control circuit is configured to continuously change said plurality of phase control voltages such that said plurality of metamaterial structures respectively generate said output signals at a continuously changing plurality of different output phases such that said scan beam is swept in a two-dimensional pattern across said field.

16. The phased array apparatus of claim 7,
wherein said plurality of metamaterial structures are arranged in a two-dimensional array such that said metal island structures are aligned in a plurality of rows and a plurality of columns, and
wherein said control circuit is configured to continuously change said plurality of phase control voltages such that said plurality of metamaterial structures respectively generate said output signals at a continuously changing plurality of different output phases such that said directed beam is scanned in a three-dimensional region.

17. A vehicle collision avoidance system for avoiding collision of a host vehicle with one or more objects, the vehicle including an adaptive cruise control system capable of assuming automated control of the vehicle, the vehicle collision avoidance system comprising:
a phase shifting element array including a plurality of metamaterial structures disposed to receive a single electromagnetic radiation input signal having a radio wave frequency in the range of 2.4 GHz to 300 GHz, each said metamaterial structure configured to resonate at said radio wave frequency such that said each metamaterial structure generates an associated electromagnetic radiation output signal having said radio wave frequency, wherein said phase shifting element array is mounted on said vehicle such that said output signals generated by said plurality of metamaterial structures are directed into a field located adjacent to said vehicle;
a beam control circuit configured to generate a plurality of variable capacitances and to apply each said variable capacitance to an associated said metamaterial structure such that an effective capacitance of said associated metamaterial structure is altered by a corresponding change in each said applied variable capacitance, whereby said plurality of metamaterial structures respectively generate said electromagnetic radiation output signals at corresponding output phases determined by said plurality of variable capacitances, wherein said beam control circuit is further configured to vary said plurality of variable capacitances such that a combined electromagnetic wave generated by said output signals is reinforced in an angular emission direction, whereby the said output signals collectively generate a scan beam directed in the angular emission direction, and wherein said beam control circuit is further configured to gradually change said plurality of variable capacitances such that the scan beam direction of the scan beam emitted from said phase shifting element array gradually changes, thereby causing the scan beam to sweep across said field;
a receiver configured to detect beam portions of said scan beam that are reflected from one or more objects disposed in said field, and to generate beam detection data indicating detection of said one or more objects in accordance with said detected beam portions, and
a signal processing circuit configured to detect the position of said one or more objects in said field in accordance with said beam detection data, and to transmit collision control avoidance data to said adaptive cruise control system such that said adaptive cruise control system assumes automated control of the vehicle to avoid collision with said one or more objects.

18. The vehicle collision avoidance system of claim 17,
wherein said plurality of metamaterial structures are arranged in a one-dimensional array such that said metal island structures are aligned in a row, and
wherein said control circuit is configured to continuously change said plurality of phase control voltages such that said plurality of metamaterial structures respectively generate said output signals at a continuously changing plurality of different output phases such that said scan beam is swept into a two-dimensional pattern across said field.

19. The vehicle collision avoidance system of claim 17,
wherein said plurality of metamaterial structures are arranged in a two-dimensional array such that said metal island structures are aligned in a plurality of rows and a plurality of columns, and
wherein said control circuit is configured to continuously change said plurality of phase control voltages such that said plurality of metamaterial structures respectively generate said output signals at a continuously changing plurality of different output phases such that said scan beam is swept through a three-dimensional region of said field.

20. A vehicle comprising:
an adaptive cruise control system capable of assuming automated control of the vehicle; and
an object detection system including:
a signal source configured to generate an electromagnetic radiation input signal having a radio wave frequency in the range of 2.4 GHz to 300 GHz;

a phase shifting element array including a plurality of metamaterial structures disposed in proximity to said signal source such that said plurality of metamaterial structures are subjected to said input signal, each said metamaterial structure configured to resonate at said radio wave frequency such that said plurality of metamaterial structures respectively generate electromagnetic radiation output signals having said radio wave frequency, wherein said phase shifting element array is mounted on said vehicle such that said output signals are directed into a field located adjacent to said vehicle;

a beam control circuit configured to generate a plurality of variable capacitances and to apply each said variable capacitance to an associated said metamaterial structure such that an effective capacitance of said associated metamaterial structure is altered by a corresponding change in each said applied variable capacitance, whereby said plurality of metamaterial structures respectively generate output signals at corresponding output phases determined by said plurality of variable capacitances, wherein said beam control circuit is further configured to vary said plurality of variable capacitances such that a combined electromagnetic wave generated by said output signals is reinforced in an angular emission direction, whereby the said output signals collectively generate a scan beam directed in the angular emission direction, and wherein said beam control circuit is further configured to gradually change said plurality of variable capacitances such that the scan beam direction of the scan beam emitted from said phase shifting element array gradually changes, thereby causing the scan beam to sweep across said field;

a receiver configured to detect beam portions of said scan beam that are reflected from one or more objects disposed in said field, and to generate beam detection data indicating detection of said one or more objects in accordance with said detected beam portions, and a signal processing circuit configured to detect the position of said one or more objects in said field in accordance with said beam detection data, and to transmit collision control avoidance data to said adaptive cruise control system such that said adaptive cruise control system assumes automated control of the vehicle to avoid collision with said one or more objects.

* * * * *